Figure 3:
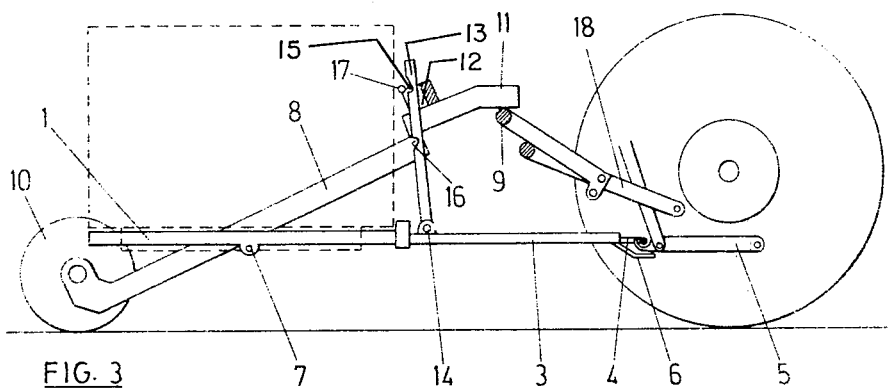

United States Patent [19]

da Silva Bento

[11] 3,941,264

[45] Mar. 2, 1976

[54] SELF-LOADING TRAILER FOR TRACTORS

[76] Inventor: Julio Cesar Santos da Silva Bento, Rua Sao Joao de Brito, Linda-a-Velha, Portugal

[22] Filed: Aug. 15, 1974

[21] Appl. No.: 497,637

[30] Foreign Application Priority Data
Aug. 17, 1973 Portugal.................................. 60405

[52] U.S. Cl........... 214/390; 280/43.17; 280/415 R; 280/461 A
[51] Int. Cl.² ........................................... B60P 1/44
[58] Field of Search ......... 214/390, 766; 280/43.17, 280/43.18, 43.23, 415 R, 461 A

[56] References Cited
UNITED STATES PATENTS
3,039,633  6/1962  Mindrum et al.................... 214/390

*Primary Examiner*—Robert G. Sheridan
*Attorney, Agent, or Firm*—Haseltine, Lake & Waters

[57] ABSTRACT

A self-loading trailer includes two U-shaped frames nested one into the other and pivoted by means of two coaxial pins. The inside frame functions as load forks and the outside frame functions as a lever. The outside frame has ground engaging wheels toward the rear thereof and is connectable at the front end to the lift bars of a tractor hitch. Actuation of the lift bars raises and lowers the load forks.

5 Claims, 5 Drawing Figures

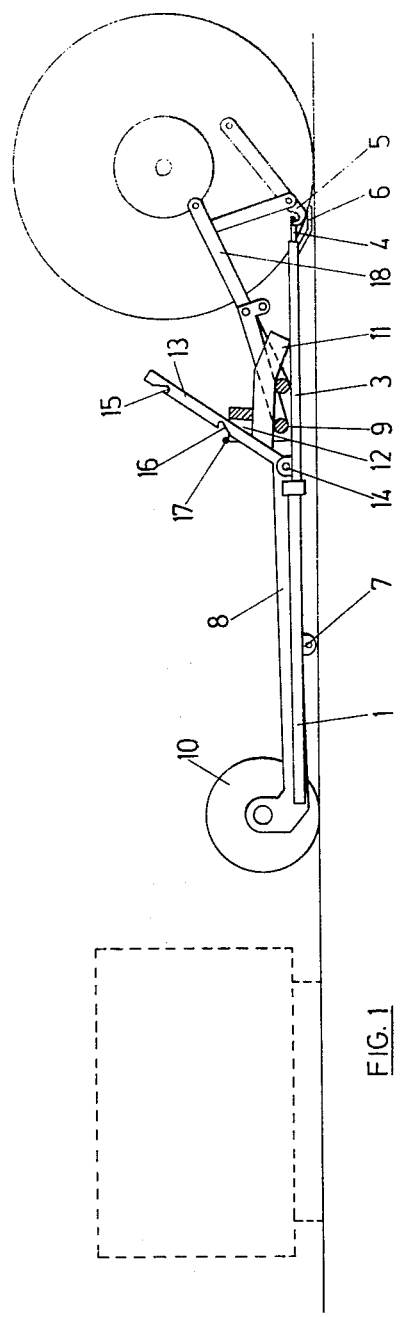
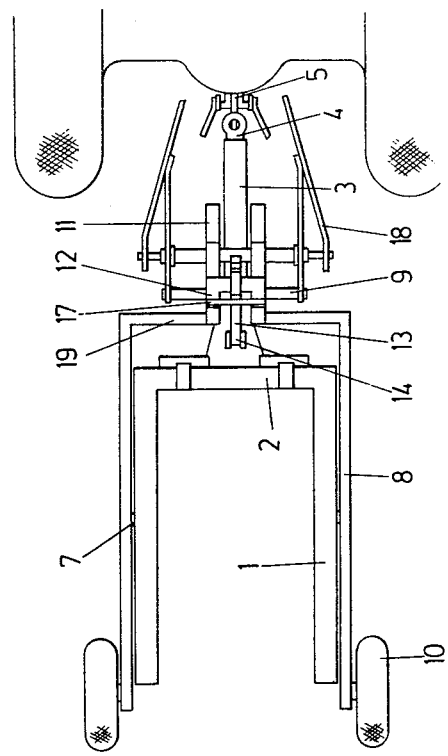

SELF-LOADING TRAILER FOR TRACTORS

This invention relates to a self-loading trailer mainly intended for farm tractors which, due to its extraordinary simple manufacturing and handling characteristics, allows any type of agricultural utilization of a normal tractor, to get — with a small aditional investment — a piece of equipment to lift and carry loads that could never be handled without use of expensive special equipment, usually out reach of the majority of the agricultural users.

Concerning the way it lifts the load, this trailer is similar to a fork-lift truck, so the loads must have a clearance from the ground, for example, by placing them on "pallets". The self-loading characteristics result from its capacity for lifting loads to a level that makes possible its transport like a normal trailer towed by the tractor, even an irregular farm ground.

What makes this trailer so simple is the principle upon which it is based: it does not have — like the normal fork-lifts — its own hydraulic system. It is by the action of some tractor parts moved by its hydraulic system (rear bars and automatic pick-up hitch) that the lift and lower movements of the trailer's loading forks are originated. The trailer's purely mechanical system — with wheels supported on the ground — multiply the tractor hydraulic bars force, making possible, with good stability, the lifting of loads much higher than those which could be directly suspended from the tractor rear bars.

The new self-loading trailer consists basically of two U shaped frames, nested into one another pivoted by means of two coaxial pins. The inside frame are the load forks and the other staying outside work as a lever:

- The inside U forks define the load plan that moves horizontally during the the lift and lower movements. For loading, these forks are set under the palletized load to be lifted; The U forks are prolonged forward by a central beam, ending on an eyelet which connects to the tractor's hitch;
- The outside U shaped lever frame has wheels on the rear ends and is articulated to the inside U load forks. It changes from the horizontal position to an inclined position by the lifting action, done by the tractors hydraulic bars, of the front part of this lever frame. The rear wheels of the lever frame are supported on the ground.

As the articulation axle between the two above-mentioned U parts — load forks and lever frame — is located on an intermediate zone of the lever frame, it is possible to lift the axle approximateley the same height as the front eyelet of the load forks (lifted by the automatic pickup tractor hitch); thus the loading platform moves up almost horizontally.

The attached figures will help to explain the basic principles of the operation of the new articulated trailer. The drawings represent:

FIG. 1 : A side view of the trailer's articulated system, the load forks completely lowered, approaching the load staying on a pallet ; the tractor's rear parts, namely bars and the pickup hitch (both hydraulically lowered), can also be seen.

FIG. 2 : A top view of the same position of FIG. 1) showing the two U articulated frames and the similitude to the fork-lifts, specially in the way the load is picked up; that explains why there are no connecting shafts between the trailer's wheels or the U frames articulation pins as they would interfere with the pallet parts laying on the ground.

FIG. 3 : A side view of the trailer on his highest position, determined by the corresponded highest position of the tractor rear bars and hitch, showing the pallet already lifted and supported by the load forks (inside U frame)

Figure 4:
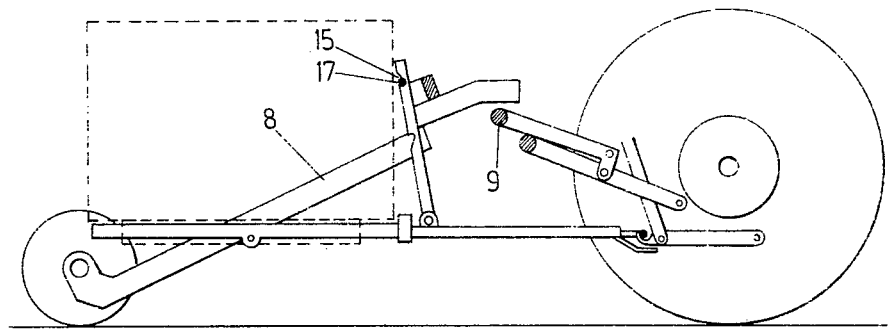

FIG. 4 : Another side view of the trailer, now in position for driving. Connecting load forks and lever frame there is a column that permits to join the two articulated parts, so that the weight of the load is now transferred from the tractor's rear bars to the towing hitch, like on any common one-axle trailer.

Figure 5:
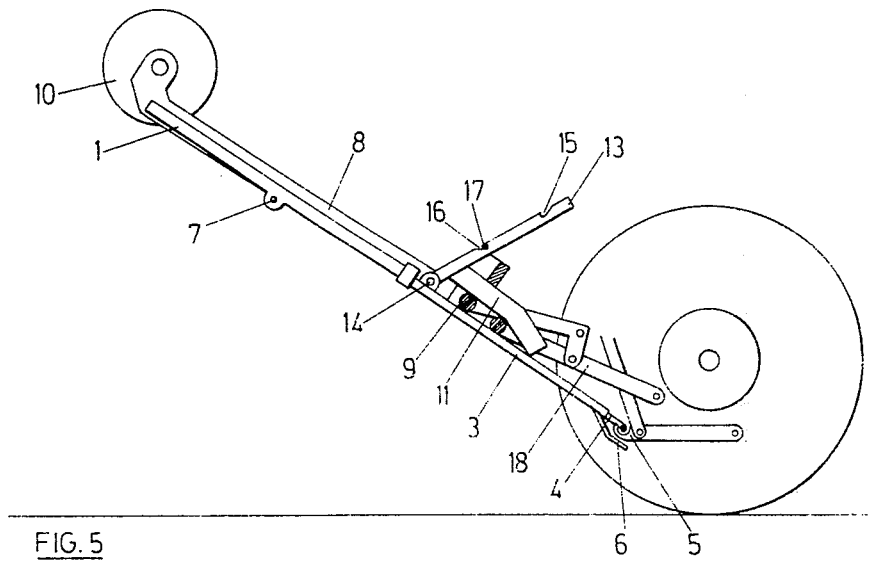

FIG. 5 : A side view corresponding to a special hanged position only used when the trailer is unloaded; that is done using the same column, but now for locking together load forks and lever frame just the begining of hydraulic lifting of the tractor's bars and hitch.

This self-load lifting trailer is distinguished by the fact of the inside U frame —the loading platform — being formed by two parallel forks 1 connected by a cross piece 2. This U frame is extended forward by a central beam 3, which ends with the eyelet 4 to couple with the tractor's hitch 5. Underneath eyelet 4 there is a retainer 6 that will prevent accidental unlocking of the eyelet 4 from the hitch 5. The inside U frame, or loading platform is connected to the outside U lever frame 8 + 19 by two coaxial pins 7 placed aproximately at load fork's halfway point. It is this outside U frame, working as a lever of second order, which multiplies the hydraulic force available at the tractor bars 18.

On the two rear ends of the lever frame 8+19 there are wheels 10 acting as "fulcrum" supported on ground; the front end of the lever frame 19 is extended by contact piece 11 where the power force or "action" is applied upwards by the rear bars 18 of the tractor by means of the elongation piece 9.

The two main trailer's parts are the two above-mentioned U pieces — the load forks and the lever frame — connected to an axle by two coaxial pins. The rear hydraulic moved tractor pieces (pick-up hitch and bars), acting upon each of connected parts can open and shut them like scissors, and thus originate the lifting and lowering movements of the load forks.

This is made clear by comparing FIGS. 1 and 3. The hydraulic lifting of the tractor's bars 18 force the lifting of 11 and the inclination of the lever frame 8; this inclination raises the connecting pins 7 from ground level to a height equal to that attained by the tractor's hitch end 5, therefore, elevating the load forks plan 1 + 2 + 3 horizontally.

During the operation of lifting the load, the work is done by the bars through the lever frame 8+19+11; the connecting pins 7 are at the halfway point of the load forks 1 and as the load gravity center crosses or passes near the articulation axle, beam 3 won't almost exert any reaction force on the hitch 5.

When the lifting operation is finished, as shown on FIG. 3, the load is discharged on the tractor rear bars as pieces 11 and 9 are still contacting. Such situation, if maintained when driving, would not allow the tractor/trailer set to turn in curves. To transfer the load to the tractor hitch 5 FIG. 4, the self-loading trailer has a connecting column 13 which is able to lock the two articulated U shaped frames turning them into a rigid trailer thus making possible the spacing of the bars elongation piece 9 from trailer's contact piece 11.

Comparing FIGS. 1, 2, 3 and 4, will help for a better understanding. The column 13 has a center of rotation 14 on its lower end located on beam 3; its upper side slides through a guide 12 on the lever frame.

During lift and lower movements, column 13 tilts back and forward around center of rotation 14.

According to FIG. 1 and 3, in the first part the lifting operation column 13 is unbalanced and tilts forwards, its surface sliding on guide 12: nearly at the end of the lift, it will be unbalanced backwards and the upper groove 15 will interlock with projection 17 of lever frame as soon as the load weight is not supported by the tractor through piece (9). The upper groove 15, has a shape that won't allow sliding downwards. The mechanical interlocking of the pivoting parts of trailer is done by lowering the hydraulic bars a little after protection 17 has risen above groove 15 so that protection 17 when coming down, will automatically fit into groove 15, transferring the weight of load from tractor bars 18 through column 13 to beam 3 and from there to tractor hitch 5. Then the elongation piece 9 will be lowered to eliminate contact with 11 as shown on FIG. 4, and towing of trailer can follow without having troubles in the curves just as with any one axle trailer.

After travel, when the trailer reaches the place to unload, the hydraulic bars are then lowered slightly and elongation piece 9 is fixed again in the higher position. Lifting slightly the hydraulic bars we revert to the situation already shown on FIG. 3: The weight of load will be transferred from the hitch to the tractors bars and column 13 is released. Then 13 is manually tilted forwards at the initial stage of lowering the load to avoid the automatic locking between groove 15 and protection 17; after groove 15 stays higher than protection 17, the lowering movement can proceed with special care, until load forks reach ground level and the trailer is unloaded as shown on FIG. 1 just by towing the trailer a little forwards, in the lowest position.

The trailer can be lifted without load and turned rigid at this position, as shown in FIG. 4. But it can also, when unloaded, be totally suspended as shown in FIG. 5. For that, before lifting, column 13 should be manually pushed backwards, so that when lifting begins, the projection 17 locks into lower groove 16; then, due to the shape of groove 16 the trailer is prevented to and proceeding with the hydraulic lifting of the bars 18 and the hitch 5, the "closed" trailer will be completely suspended from the ground as shown on FIG. 5.

This possibility of completely suspending the unloaded trailer is very important when operating in restricted areas. In fact the trailer has always to "approach" and set the forks under the load in reverse; it will be therefore much easier to "aim" the trailer's forks when this is suspended then when it has its wheels on the ground. The suspended trailer shown on FIG. 5 can be lowered until the wheels are nearly touching the ground and the forks lined up with the load; upon lowering them completely, the wheels touch the ground, as shown on FIG. 1, and the forks can be set under the "pallet". As soon as the wheels touch the ground, edge 7 comes out of groove 16 and connecting column 13 tilts automatically forwards, allowing lifting the load without problems.

The forces diagram, is the following:

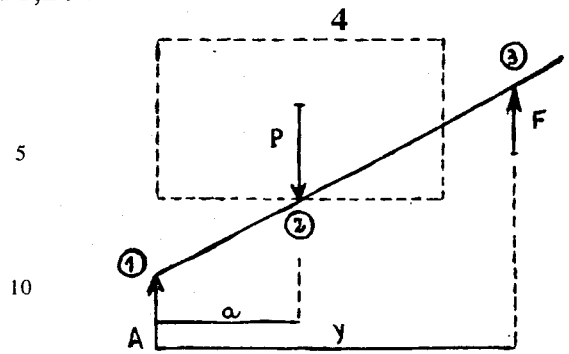

The different symbols representing:
1 — The lever frame fulcrum, corresponding to the trailer's wheels axle;
2 — The center of rotation of the two main trailer's parts - lever frame and load forks plan - simultaneous point of concentration of load P;
3 — Sliding aplication point, on the lever frame, of the lifting power F exerted by tractor's rear hydraulic bars;
P — Load
F — Lifting force from the tractor's hydraulic rear bars
A — Reaction force through the wheels upon the ground
$a$ — load lever arm
$y$ — Power lever arm
In which:
$$\begin{cases} P = A + F \\ P \times a = F \times y \end{cases}$$
The necessary lifting force, is then given by:

$$F = a/y \times P$$

And since the ratio $a/y$ is always smaller than 1, the available force F (on the tractor hydraulic bars) will lift bigger weight P.

The trailer's dimensions allows $y$ to be nearly three times as big as $a$, providing a lifting height enough for an easy application on a farm, meaning that this new equipment can lift loads three times bigger than the available hydraulic force on the rear bars. For example, an agricultural tractor of 40/45 HP range with this trailer can lift by itself and transport loads weighting up to about 1,500 Kg.

Now a few examples of application of the new device showing the many possibilities of handling loads until now was impossible to achieve without special equipments, normally not available on a farm.

In the gathering of grapes in a vineyard, more and more big standardized tubs are used (in Portugal with 1.5 m³ holding up to 1,5 tons).

Usually 2 or 3 of these tubs are placed on a big trailer that due to its dimensions cannot park near the workers in the middle of the vineyards. So these men have to make long walks from where they are gathering the grapes, with full baskets, to where the trailer with the tubs is parked; then they have to climb up to the level of the trailer platform and tilt the basket full of grapes into the big tubs. It is not uncommon that an operator wastes more time in carrying the baskets, than in gathering the grapes; with the quickly increasing wages all over the world, this results in very expensive wines.

As the new trailer needs an area slightly bigger than that of a tub, it is possible with this trailer to place tubs in the middle of the vineyards, therefore very near the The long walks are eliminated; but not only that — the tilting of the full baskets into the tubs is also done much more quickly and without effort at ground level. As the working area is changing, the tubs are easily moved by the new trailer assuring always very short distances between men and tubs.

It is exactly in "narrow passages" like those in vineyards or in orchards (for collecting, for example, fruit in boxes placed upon pallets within the tree lines) that the possibility of suspending the trailer completely, as shown in FIG. 5, assumes its full meaning.

Another of the many uses for the new trailer is for watering or irrigation purposes or in any other water transportation problem. With two tubs or containers the work can proceed almost continuously, while one tub is being filled up, the tractor is performing irrigation operations with the other; when this one is empty, the tractor will come back, unload the empty tank and, taking advantage of its self-loading characteristics, take the tub or tank filled with water and proceed with the operation, nearly without loosing any time, since the tractor will not have to wait each time for the filling up of the empty tank.

Obviously the new trailer may also handle any type of loads that can be set or mounted on pallets, like fertilizer or grain sacks, pumps or generator sets, or any other heavy load or equipment difficult to handle in a farm.

The figures on the attached drawingd were shown and should be understood only as examples susceptible of many variations in dimensions, shape, applied materials and manufacturing details, etc., without changing the basic principles of the present invention.

I claim:

1. A self-loading trailer to couple with farm tractors, having hydraulically moved rear bars comprising, in combination, two mechanical frames articulated together and forming a pivot; a tractor rear towing device; one of the frames defining a horizontal load plan and extending forward to couple with said tractor rear towing device; the other frame comprising a multiplying force lever of second order and supported on the ground on its rear end, said lever being actuated on its front end by the tractor's hydraulically moved rear bars and applying the multiplied tractor hydraulic force between its two ends to the first frame on said pivot.

2. A self-loading trailer according to claim 1, wherein one of said frames is an interior frame and the other frame is an exterior frame; the rear part of said interior frame defining the load plan and being U-shaped; two parallel forks on said interior frame and set under the load to be lifted; a beam with terminal means to couple to the tractor's rear towing device, said U frame being extended to the front side by said beam terminal means; an automatic pick-up hitch moving with the hydraulic bars and disposed of by the tractor, the load plan lifting and dropping horizontally as the height attained by said pivot of the load forks with said exterior frame is equal to the stroke of the pick-up hitch, said exterior frame conprising said multiplying force lever of second order.

3. A self-loading trailer according to Claim 2, wherein the rear part of the external frame comprises said lever of second order in the lifting operation, said external frame being also U-shaped and having two rear ends of coaxial wheels supported on the ground to form a lever fulcrum, the front part of said external frame being extended by a piece where the force is applied by the tractor hydraulic rear bars; two coaxial pins between said fulcrum and applied force of the lever of the external frame and articulating the exterior lever U frame with the interior load U frame, the lever arm between said fulcrum and the applied force comprising a resistance arm having a resistance point at said coaxial pins.

4. A self-loading trailer for tractors according to claim 3 wherein the lengths of the arms of the lever frame, have a ratio for providing substantial multiplier effect of the lifting force available on the tractor rear bars and attaining two to three times the lifting force.

5. A self-loading trailer for tractors according to claim 4, including a tilting column articulated on the beam of the load platform and allowing interconnection in different fixed positions with the lever frame.

* * * * *